US009013655B2

(12) United States Patent
Kitson et al.

(10) Patent No.: US 9,013,655 B2
(45) Date of Patent: Apr. 21, 2015

(54) TRANSFLECTIVE DISPLAYS (75) Inventors: Stephen Kitson, Bristol (GB); Adrian Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 157 days.

(21) Appl. No.: 13/811,726

(22) PCT Filed: Jul. 26, 2010

(86) PCT No.: PCT/US2010/043252
§ 371 (c)(1),
(2), (4) Date: Jan. 23, 2013

(87) PCT Pub. No.: WO2012/015387
PCT Pub. Date: Feb. 2, 2012

(65) Prior Publication Data
US 2013/0120700 A1 May 16, 2013

(51) Int. Cl.
*G02F 1/1347* (2006.01)
*G02F 1/1335* (2006.01)

(52) U.S. Cl.
CPC .... *G02F 1/133555* (2013.01); *G02F 1/133602* (2013.01); *G02F 1/13475* (2013.01);
(Continued)

(58) Field of Classification Search
CPC .................................................. G02F 1/13473
USPC ..................................................... 349/74, 80
See application file for complete search history.

(56) References Cited

U.S. PATENT DOCUMENTS 5,625,474 A 4/1997 Aomori et al.
5,799,231 A 8/1998 Gates
(Continued)

FOREIGN PATENT DOCUMENTS

JP 09-015591 1/1997
JP 09-061819 3/1997
(Continued)

OTHER PUBLICATIONS

European Search Report and Search Opinion, Mar. 21, 2014. Hewlett-Packard Development Company, L.P., EP Patent Application No. 10855421.3.
(Continued)

*Primary Examiner* — Wen-Ying P Chen
(74) *Attorney, Agent, or Firm* — Dierker & Associates (57) ABSTRACT

A transflective display (10) includes a backlight (14) and a display stack (12, 12'). The display stack (10) includes a first electro-optic layer (24) configured to modulate light of a first waveband and a second electro-optic layer (26) configured to modulate light of a second waveband that is different from the first waveband. A mirror (30) is positioned between the first and second electro-optic layers (24, 26) such that the first electro-optic layer (24) is positioned adjacent to a first surface ($S_{1M}$) of the mirror (30) and has a surface ($S_1$) that is configured to face an external light source (22), and the second electro-optic layer (26) is positioned adjacent to a second surface ($S_{2M}$) of the mirror (30) and has a surface ($S_2$) that is configured to face the backlight (14). The mirror (30) is also configured to partially reflect and partially transmit wavelengths in the first waveband and to at least partially transmit wavelengths in the second waveband.

19 Claims, 6 Drawing Sheets

(52) U.S. Cl.
CPC ............... *G02F2001/133557* (2013.01); *G02F 2001/133616* (2013.01); G02F 1/1347 (2013.01); *G02F 2203/09* (2013.01); *G02F 2203/34* (2013.01)

(56) References Cited

U.S. PATENT DOCUMENTS

| | | |
|---|---|---|
| 7,385,659 B2 | 6/2008 | Kotchick et al. |
| 7,499,073 B2 | 3/2009 | Hladik et al. |
| 7,616,368 B2 | 11/2009 | Hagood, IV |
| 7,636,140 B2 | 12/2009 | Beeren |
| 2007/0040965 A1 | 2/2007 | Kuan |
| 2007/0115398 A1 | 5/2007 | Harada et al. |
| 2007/0242198 A1 | 10/2007 | Watson et al. |
| 2007/0247573 A1 | 10/2007 | Ouderkirk et al. |
| 2009/0140961 A1 | 6/2009 | Geisow et al. |

FOREIGN PATENT DOCUMENTS

| | | |
|---|---|---|
| JP | 2002014629 | 1/2002 |
| KR | 10-1999-0011806 | 2/1999 |
| TW | 200807084 A | 2/2008 |
| WO | PCT/US2009/061627 | 10/2009 |
| WO | PCT/US2010/032968 | 4/2010 |

OTHER PUBLICATIONS

International Preliminary Report on Patentability, Feb. 7, 2013, The International Bureau of WIPO, PCT Patent Application No. PCT/US2010/043252.

ISR/WO, PCT/US2010/043252, HP reference 82263575, Mar. 28, 2011, 9 pps.

TRANSFLECTIVE DISPLAYS

BACKGROUND

The present disclosure relates generally to transflective displays.

Displays may be reflective (i.e., ambient light is used to illuminate the display), emissive (i.e., light emitted from a light source of the display is used to illuminate the display), or transflective (i.e., uses ambient light and/or light from a light source of the display for illuminating the display). Transflective displays exhibit reflective properties when illuminated by ambient light and transmissive properties when illuminated by the display light source. As a result, transflective displays are useful in both bright and dark environments.

BRIEF DESORPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

One embodiment of the transflective display disclosed herein includes an interlayer mirror sandwiched between two electro-optic layers. The interlayer mirror is partially reflective and also partially transmissive of a waveband that is modulated by the electro-optic layer positioned closest to the mirror, on the side of the display that is exposed to an external light source. As shown in at least some of the figures, when, a display is oriented with the viewing surface in a horizontal plane with a backlight near the bottom of the display, the interlayer mirror is partially reflective and partially transmissive of the waveband that is modulated by the electro-optic layer positioned above the mirror (i.e. the closest electro-optic layer in proximity to the mirror, on the side of the display that faces the external light source). The partial reflective and partially transmissive nature of the mirror enables the device to be used in a reflective mode or an emissive mode. More particularly, the mirror can advantageously reduce loss and improve color performance in the reflective mode, while still allowing suitable backlight transmission in the emissive mode.

When an embodiment of the mirror is described as being partially reflective of at least some of the wavelengths in a waveband, it is to be understood that the mirror is also partially transmissive of at least some of the wavelengths in that waveband.

Figure 1A:
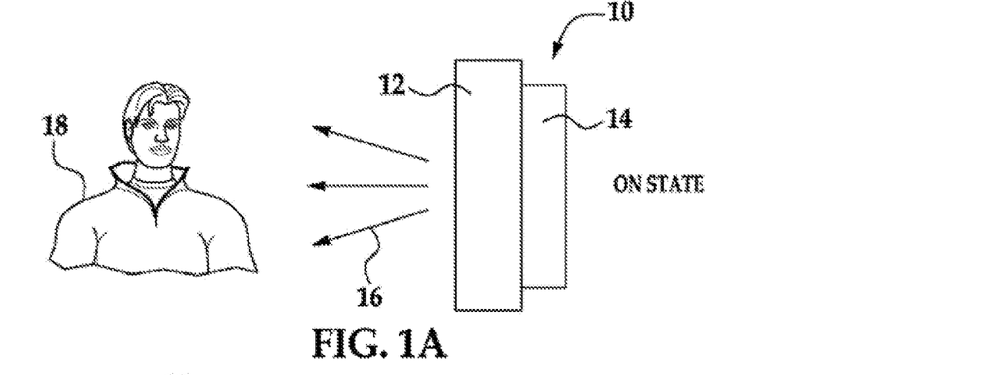
FIGS. 1A and 1B are schematic side views of an embodiment of a transflective display when the backlight is on and when the backlight is off.
Figure 1B:
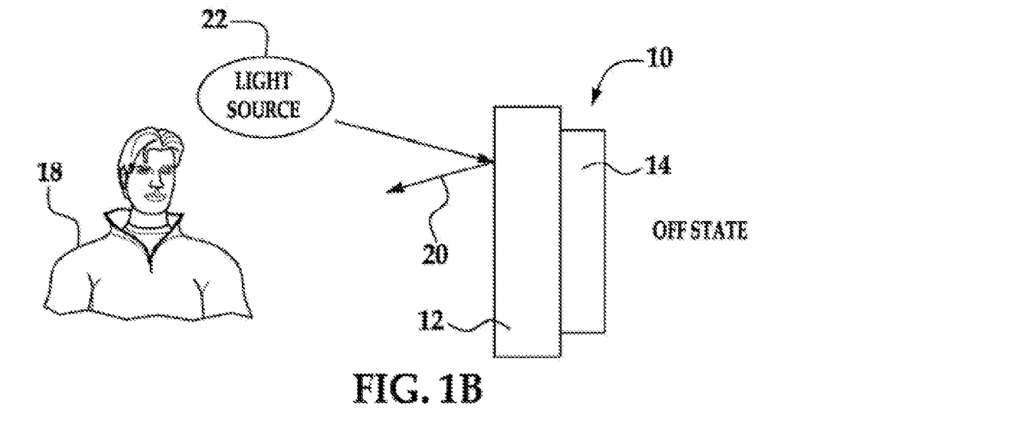

The emissive mode and reflective mode of a transflective display are shown schematically in FIGS. 1A and 1B. More particularly, FIGS. 1A and 1B schematically illustrate side-views of an embodiment of the transflective display 10, which includes multiple display stacks 12 (which are discussed further in reference to the other figures) and a light source 14 (also referred to herein as a backlight). In emissive mode (see FIG. 1A), the backlight 14 is in an ON state and emits enough light 16 through the various display stacks 12 so that the display screen (not shown) illuminated and is viewable, for example, by viewer 18. In reflective mode (see FIG. 1B), the backlight 14 is in an OFF state and does not emit light 16. Rather, in reflective mode, the various display stacks 12 are configured to partially reflect ambient light 20 from an external light source 22. The external light source 22 may be any source of light common to home, work, or an outdoor environment. In one embodiment, the external light source emits white light, which includes red light, green light, and blue light. In reflective mode, light 20 incident on the various display stacks 12 is modulated so that the display screen reflects a desired color at desired coordinates of the display 10. It is to be understood that the transflective display 10 may also operate simultaneously in the reflective and transmissive modes. This may occur, for example, when the ambient light is present, but is not enough to achieve a bright display of colors.

Light is electromagnetic radiation of a wavelength that is visible to the human eye. A color adjective placed in front of the term light is used to specify a wavelength range of light which the human eye sees as a particular color. As one non-limiting example, the terms "red light", "red color region", and "red waveband" refer to electromagnetic radiation in the waveband of about 600 nm to about 700 nm.

A waveband includes all of the wavelengths within the stated range. For example, the blue waveband includes all of the wavelengths within the range of 400 nm to 500 nm.

An electro-optic layer is a layer which is configured to selectively absorb light of a specific waveband within the visible spectrum. Various types of electro-optic systems may be used in the methods and systems embodying principles described herein including, but not limited to, dichroic guest host systems (e.g., liquid crystal systems), electrophoretic systems, electrochromic, systems, and electrowetting systems. An electro-optic layer is also commonly referred to as a light modulation layer.

Figure 2:
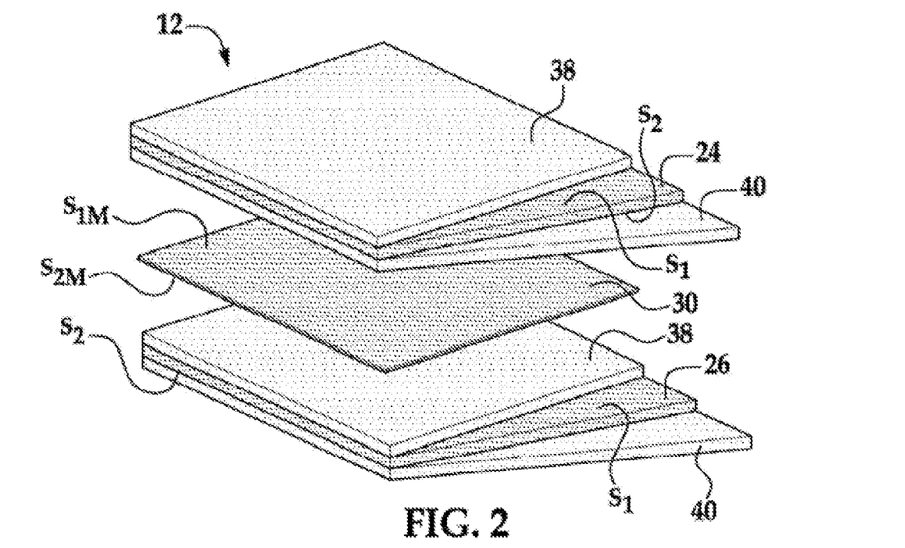
FIG. 2 is a perspective exploded view of one embodiment of a display stack.
Figures 3A, 3B:
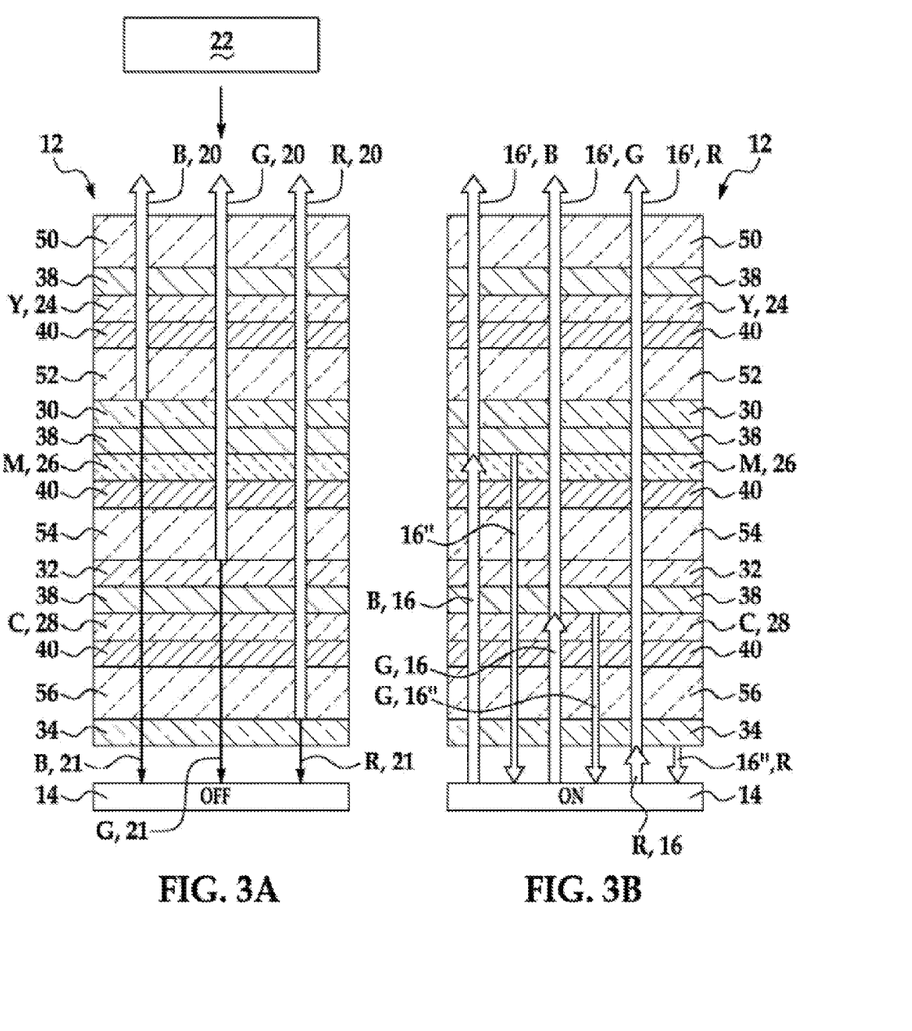
FIGS. 3A and 3B are cross-sectional views of one embodiment of a display stack in reflective mode (FIG. 3A) and emissive/backlight mode (FIG. 3B)

The display 10 disclosed herein is made up of a plurality of pixels or display stacks 12. One embodiment of a pixel or display stack 12 is shown in FIG. 2. The stack 12 includes two electro-optic layers 24, 26 and an interlayer mirror 30 positioned between the electro-optic layers 24, 26. Other embodiments include three electro-optic layers 24, 26, 28 and three interlayer mirrors 30, 32, 34. Non-limiting examples of these embodiments are shown in FIGS. 3A and 3B. It is to be understood that FIGS. 2, 3A and 3B will be now be discussed together.

In the embodiments shown in these figures, each electro-optic layer 24, 26, 28 has an electrode 38, 40 adjacent (i.e., in contact with or having other layer(s) therebetween) to either its first surface $S_1$ or its second surface $S_2$, or has electrodes 38, 40 adjacent to both its first and second surfaces $S_1$, $S_2$. In another embodiment, one electrode 40 is positioned adjacent to a surface $S_{1M}$ of a mirror 30 (or 32, 34) that partially reflects and partially transmits wavelengths modulated by the electro-optic layer 24 (or 26, 28). In still another embodiment which is not shown in the Figures, one electrode 40 is utilized, and this electrode 40 is positioned adjacent to a surface $S_{2M}$ of the mirror 30 (or 32, 34). This embodiment tends to increase the operating voltage of the display 10, but also reflects the light prior to the light reaching the electrode 40, which can reduce the amount of light lost in the stack 12. In other embodiments not shown in the drawings, a thin non-transparent electrode (e.g., a thin metal busbar electrode) may be positioned adjacent to a portion of one or both surfaces $S_1$, $S_2$, or a thin non-transparent electrode may be connected to a pixel wide transparent electrode. In one embodiment, the electrode(s) 38, 40 is/are made of a material that is both electrically conductive and optically transparent. Non-limiting examples of suitable electrically conductive and optically transparent materials include indium tin oxide (ITO) or polyethylenedioxythiophene polystyrenesulfonate (PEDOT:PSS). As will be discussed further hereinbelow, by changing the voltages at one or both of the electrodes 38, 40, the optical properties of the respective electro-optic layer 24, 26, 28 may be changed so as to allow light of selective wavelengths to be absorbed or transmitted.

Figure 4A:
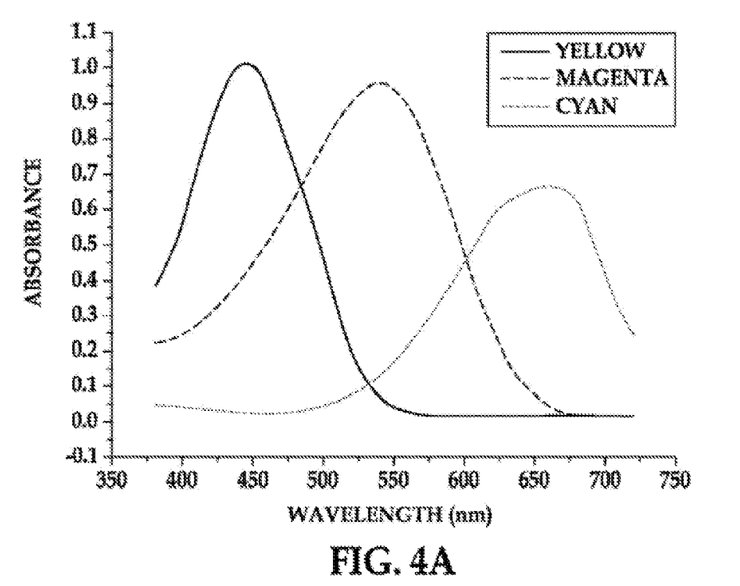
FIGS. 4A and 4B are real spectra of dichroic dyes in liquid crystals and ideal spectra of dichroic dyes in liquid crystals, respectively.
Figure 4B:
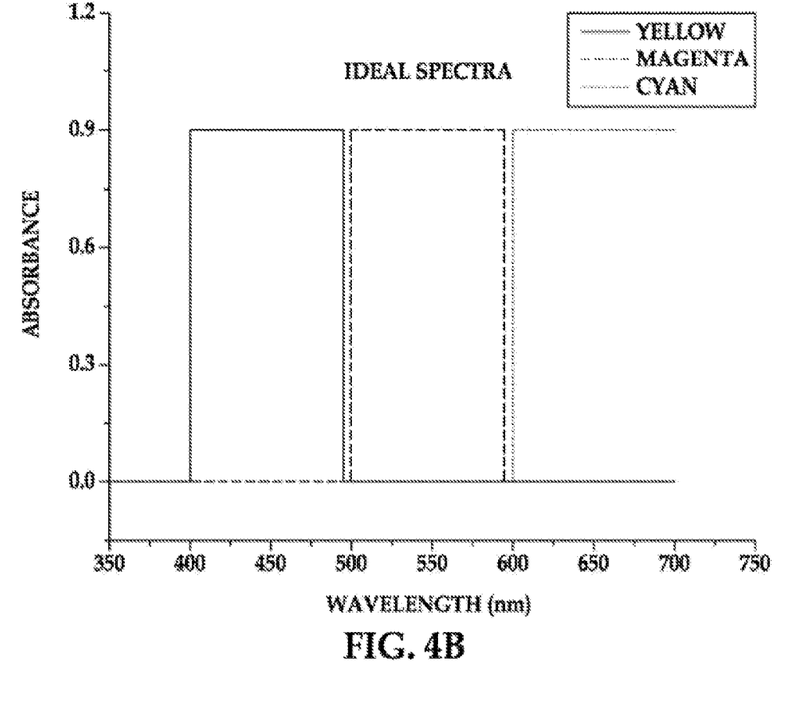

Each electro-optic layer 24, 26, 28 is configured to modulate light in a particular waveband, where the waveband modulated by one electro-optic layer 24 is different from the waveband modulated by each other electro-optic layer 26 and 28. More particularly, each of the electro-optic layers 24, 26, 28 selectively modulates absorption in a particular waveband and, is substantially transparent (and thus does not modulate absorption) in other wavebands. In practice, it is to be understood that some overlap in the absorption spectra of the electro-optic layers 24, 26, 28 may take place, often on the short wavelength side. FIG. 4A is the spectra of dichroic dyes (yellow, magenta, and cyan) in liquid crystals (zli2806 from Merck KGaA). The yellow dye is G232 from Hayashibara Biochemical Laboratories, Inc., and the magenta dye is G471 from Hayashibara Biochemical Laboratories, Inc. Both the yellow and magenta dyes are present in the liquid crystal host at a concentration of 1 weight %. The cyan dye is AC1 from Nematel GmbH & Co. KG, and is present in the liquid crystal host at a concentration of 2 weight %. These spectra illustrate the previously mentioned overlap. It is to be understood that the interlayer mirrors 30, 32, 34 aid in mitigating the effects of this overlap in the reflective mode in an attempt to achieve the ideal absorption spectra shown in FIG. 4B.

The electro-optic layers 24, 26, 28 have an optical absorption that is electrically modulated. As previously mentioned, each of the electro-optic layers 24, 26, 28 may be a dichroic (or dyed) guest host liquid crystal system, an electrophoretic system, an electrochromic system, or an electrowetting system. When a dyed guest, host liquid crystal system is used for the electro-optic layer 24, 26, 28, the voltage applied to the respective surrounding electrode(s) 38, 40 may alter the alignment of the dyed liquid crystal to either absorb or transmit light in a particular waveband. In one embodiment, the default state (e.g., when no voltage is applied) of the electro-optic layers 24, 26, 28 is to let light of all visible wavelengths pass. When a voltage is applied to one or both of the surrounding electrodes 38, 40, the nematic liquid crystal structure within the adjacent electro-optic layer 24, 26, or 28 may be reoriented so that the electro-optic layer 24, 26, 28 absorbs light within its corresponding waveband, while not substantially affecting light of other wavelengths. In this particular embodiment, the liquid crystal is vertically aligned with respect to the surface of an adjacent electrode 38, 40 when no voltage is applied, and thus no color is displayed. In this case, the liquid crystal has a low birefringence and has a chiral dopant added therein. When a voltage is applied, the chiral liquid crystal is driven planar, and thus becomes twisted. The twisted configuration causes the liquid crystal to absorb light, and thus color is displayed. This system is also commonly known as the White-Taylor configuration.

Figure 10:
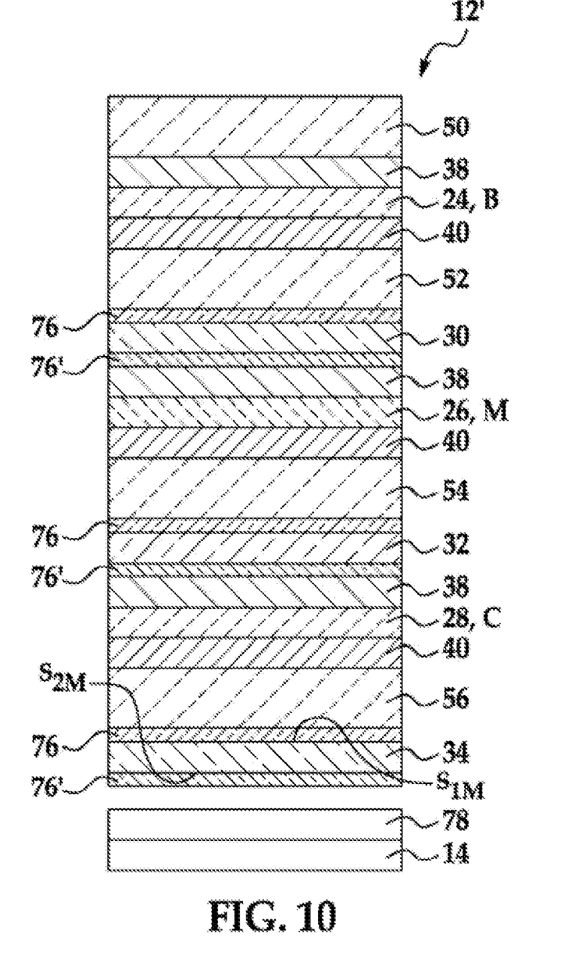
FIG. 10 is a cross-sectional view of yet another embodiment of a display stack.

If the twisted liquid crystal configuration previously described is not used, but rather an un-twisted liquid crystal configuration is used, the display stack will 12 include quarter waveplates (an example embodiment of which is shown in FIG. 10). In one embodiment when the un-twisted liquid crystal configuration (commonly known as the Cole-Kashnow configuration) is used, a voltage is applied to the stack 12 to achieve the transparent state, during which the liquid crystal is vertically aligned with respect to the surface of an adjacent electrode 38, 40 and the electro-optic layer 24, 26, 28 allows light of all visible wavelengths to pass. In this embodiment, when the voltage is removed, the nematic liquid crystal structure within the adjacent electro-optic layer 24, 26 or 28 may be reoriented so that the electro-optic layer 24, 26, 28 absorbs light within its corresponding respective waveband, while not substantially affecting light of other wavelengths. As such, in this embodiment when the voltage is removed (i.e., not applied), the liquid crystal becomes horizontally aligned with respect to the surface of an adjacent electrode 38, 40, and color is displayed.

It is to be understood that the two previous example embodiments (i.e., the White-Taylor configuration or the Cole-Kashnow configuration) could be operated in the opposite manner with respect to the driving voltage. By selecting an appropriate liquid crystal, either example embodiment could be engineered such that the voltage off state is either the transparent state or the colored state.

In another embodiment the electro-optic layers 24, 26, 28 may use an electrophoretic system to either absorb or transmit light of a particular wavelength. An electrophoretic system includes charged particles suspended within a fluid. A voltage applied to one or both of the surrounding electrode(s) 38, 40 creates an electric field which causes the charged particles to move to different positions within the fluid. For example, the charged particles may be gathered into a small region of the display stack 12 so that the majority of the pixel area is clear when transmitting light. In one non-limiting example, the charged particles may be gathered out of view behind a reflecting element (not shown). Alternatively, when it is desired to absorb light, the voltage and electric field may be changed so that the charged particles are present across the pixel area and therefore into view. The charged particles may also be dyed or pigmented so as to absorb light of a particular wavelength range.

In still other embodiments, the electro-optic layers 24, 26, 28 may use electrowetting to either absorb or transmit light of a particular wavelength. Electro-wetting is a process by which the wetting properties of a hydrophobic surface are manipulated via an applied voltage and a generated electric field.

The electro-optic layers 24, 26, 28 are selected from yellow electro-optic layers, magenta electro-optic layers, and cyan electro-optic layers. In some embodiments, the display stack 12 includes two of these layers 24, 26 (see FIG. 2), and in other embodiments, the display stack 12 includes all three of these electro-optic layers (see FIGS. 3A and 3B), and in still other embodiments, the display stack 12 may include four or more electro-optic layers (e.g., to provide more control over the modulation of color). In a display stack 12 including two electro-optic layers, it is believed that the electro-optic layer 24 can be configured to independently modulate two different wavebands. For example, there may be two different electrophoretic species with different charges and/or mobilities in the electro-optic layer 24, with each species being a different color. In this embodiment, the interlayer mirror 30 behind or beneath (depending upon the orientation of the stack 12 with respect to the external light 22) the electro-optic layer 24 would be designed to partially reflect and partially transmit both wavebands.

The embodiment shown in FIGS. 3A and 3B is one non-limiting example of the order of the electro-optic layers 24, 26, 28. However, it is to be understood that other orders are possible, depending upon the properties of the electro-optic layers 24, 26, 28 used.

Figure 8:
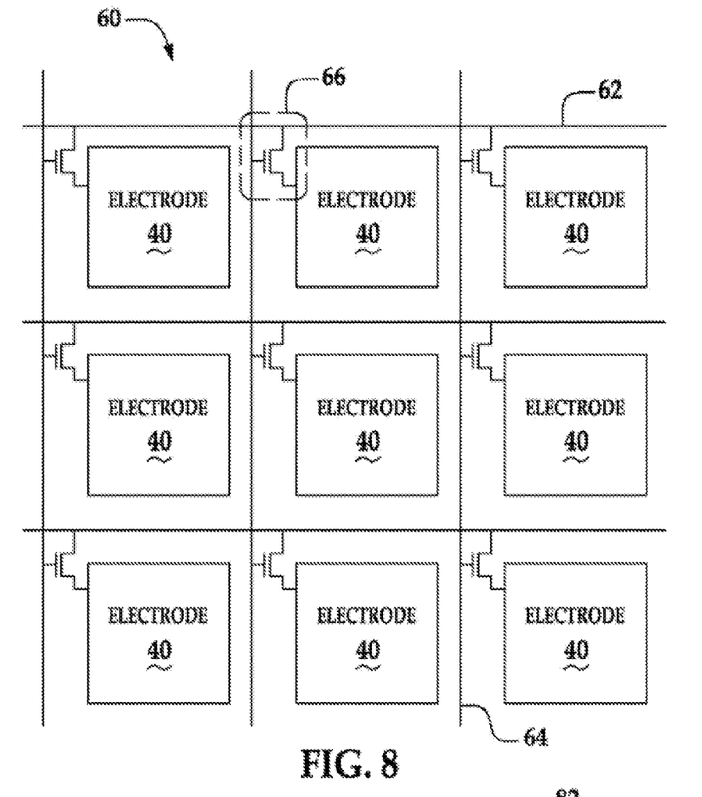
FIG. 8 is a top schematic view of an embodiment of an addressing layer that may be used in an embodiment of the display.

A yellow electro-optic layer Y, 24 (see FIGS. 5A and 3B) is configured to either absorb or transmit blue light based on the electrical state of its surrounding electrode(s) 38, 40. As will be discussed hereinbelow, the state of the electrode(s) 38, 40 may depend on signals received by an addressing layer (an example of which is shown in FIG. 8). In one embodiment, the yellow electro-optic layer Y, 24 may be configured to transmit light of all visible wavelengths by default. When it is desired that the particular pixel/display stack 12 be modulated to absorb blue light, the state of the yellow electro-optic layer Y, 24 is altered so that light within the blue color region is absorbed while light having a wavelength from the rest of the visible spectrum is still transmitted.

A magenta electro-optic layer M, 26 (see FIGS. 3A and 3B) is configured to either absorb or transmit green light based on the electrical state of its surrounding electrode(s) 38, 40. The state of the electrode(s) 38, 40 may depend on signals received by an addressing layer. In one embodiment, the magenta electro-optic layer M, 26 may be configured to transmit light of all visible wavelengths by default. When it is desired that the particular pixel/display stack 12 be modulated to absorb green light, the state of the magenta electro-optic layer M, 26 is altered so that light within the green color region is absorbed while light having a wavelength from the rest of the visible spectrum is still transmitted.

A cyan electro-optic layer C, 28 (see FIGS. 3A and 3B) is configured to either absorb or transmit red light based on the electrical state of its surrounding electrode(s) 38, 40. The state of the electrode(s) 38, 40 may depend on signals received by an addressing layer. For example, the cyan electro-optic layer C, 28 may be configured to transmit light of all visible wavelengths by default. When it is desired that the particular pixel/display stack 12 be modulated to absorb red light, the state of the electro-optic layer C, 28 is altered so that light within the red color region is absorbed.

As illustrated in FIG. 2, one interlayer mirror 30 is positioned between (although not necessarily in direct contact with) the electro-optic layers 24, 26. As illustrated in FIGS. 3A and 3B, interlayer mirrors 30, 32, 34 are respectively positioned beneath or behind (although not necessarily in direct contact with) one of the electro-optic layers 24, 26, 28. Beneath and behind are not to be construed as limiting the orientation of the display stack 12, but rather are being used to facilitate understanding of the positions of the various layers in the stack 12 relative to one another and relative to the external light source 22. Is to be understood that each of the electro-optic layers 24, 26, 28 has two opposed surfaces $S_1$, $S_2$, and one of the surfaces $S_1$ faces the direction of the external light source 22. In some embodiments, other components are included, such as alignment layers (see FIG. 9A) and substrates (see FIGS. 3A and 3B), but the surface $S_1$ of each electro-optic layer 24, 26, 28 is positioned to receive the external light prior to the surface $S_2$. The mirrors 30, 32, 34 that partially reflect and partially transmit wavelengths modulated by a particular electro-optic layer 22, 24, 28 are respectively positioned on the other surface $S_2$ of that particular electro-optic layer 22, 24, 28. "Positioned on" means that the mirror 30, 32, 34 may be directly in contact with the other surface $S_2$ of that particular electro-optic layer 22, 24, 28, or may have other layers (e.g., alignment layers, electrodes, substrates, etc.) between itself and the other surface $S_2$ of that particular electro-optic layer 24, 24, 28. As such, in the embodiment shown in FIGS. 3A and 3B, each of the mirrors 30, 32, 34 is configured to partially reflect and partially transmit wavelengths in the waveband of the electro optic layer 24, 26, 28 positioned above and closest to the mirror 30, 32, 34, and is also configured to transmit wavelengths in the waveband of the electro-optic layer(s) 26, 28 positioned below the mirror 30, 32, 34. It is to be understood that the mirror 34 positioned closest to the backlight 14 may be configured to partially reflect and partially transmit the wavelengths in the waveband of the electro-optic layer 28 positioned above and closest to the mirror 34, and can also be configured to transmit the wavelengths of the other wavebands.

In another embodiment including three electro-optic layers 24, 26, 28 and three mirrors 30, 32, 34, the middle mirror 32 may be configured to partially reflect and partially transmit the waveband of the electro-optic layer 26 immediately above it and also the waveband of the electro-optic layer 24 closest to the external light source 22. When a neutral white backlight 14 is used, the display 10 will appear neutral and white in backlit mode if the display 10 transmits substantially equally in each of the blue, green, and red wavebands. When any of the mirrors 30, 32, 34 reflects more than one waveband, balancing the color gamut and obtaining a neutral white and black in the backlit mode could still be obtained by using a backlight 14 that is proportionately brighter in the wavebands that are reflected by more than one mirror or including suitable spectral apertures designed to align with sharp emission peaks in the backlight 14.

In the embodiment shown in FIG. 2, the mirror 30 is configured to partially reflect and partially transmit wavelengths in the waveband that is modulated by electro-optic layer 24, and is also configured to transmit wavelengths in the waveband that is modulated by electro-optic layer 26. If additional electro-optic layers are included between the mirror 30 and a backlight 14, the mirror 30 will also be configured to transmit wavelengths in the wavebands that are modulated by these additional electro-optic layers. It is to be understood that the electro-optic layers 24, 26 and the mirror 30 in this embodiment may be selected to modulate, partially reflect, and partially transmit light in a manner that is desirable for the resulting display stack 12.

The embodiments shown in FIGS. 3A and 3B illustrate one non-limiting example of the stack 12. In these embodiments, a mirror 30 is positioned between the yellow electro-optic layer Y, 24 and the magenta electro-optic layer M, 26, a mirror 32 is positioned between the magenta electro-optic layer M, 26 and the cyan electro-optic layer C, 28, and a mirror 34 is positioned between the cyan electro-optic layer C, 28 and the backlight 14. The mirror 30 is a blue mirror configured to partially reflect and partially transmit wavelengths in the blue waveband (which are modulated by layer Y, 24) and to at least partially transmit wavelengths in the green and red wavebands (modulated respectively by layers M, 26 and C, 28), the mirror 32 is a green mirror configured to partially reflect and partially transmit wavelengths in the green waveband (which are modulated by layer M, 26) and to at least partially transmit wavelengths in the red waveband (modulated by layer C, 28), and the mirror 34 is a red mirror configured to partially reflect and partially transmit wavelengths in the red waveband and to at least partially transmit wavelengths in both the blue and green wavebands. In some instances, the green mirror 32 also partially reflects blue wavelengths and or the red mirror 34 partially reflects blue and green wavelengths.

In one embodiment, the mirrors 30, 32, 35 are specular mirrors. Specular mirrors may be used if diffuse characteristics are carried out by another layer in the display stack 12. For example, one or more electro-optic layers 24, 26, 28 could be selected to diffuse the waveband being modulated by the respective layers 24, 26, 28 but not diffuse the waveband being modulated by the other electro-optic layers 24, 26, 28. This ensures that each color is diffused by substantially the same amount, to avoid color shift with the viewing angle.

Figure 6:
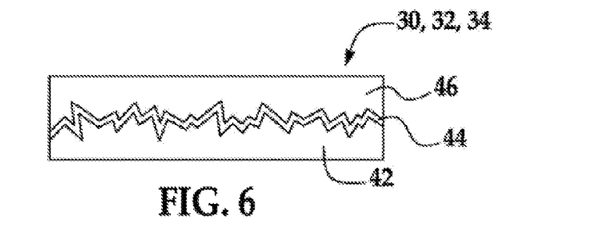
FIG. 6 is a cross-sectional view of one embodiment of a diffuse mirror.

In another embodiment, the mirrors 30, 32, 34 are diffuse mirrors. Diffuse mirrors reflect light over a range of angles. Therefore, the diffuse mirrors 30, 32, 34 disclosed herein partially reflect light in many directions, allowing a viewer 18 to see the reflected image at wider viewer angles. One example of a diffuse mirror is shown in FIG. 6. In this embodiment, the diffuse mirror 30, 32, 34 includes a diffuser patterned material 42, a wavelength selective coating 44, and a planarizing layer 46. In this embodiment, the diffuser patterned material 42 is a dielectric material that is not wavelength selective (i.e., can transmit all wavelengths). As such, the embodiment of the mirror 30, 32, 34 includes the wavelength selective coating 44 that is placed on top of the diffuser patterned material 42. In other embodiments (not shown), the diffuse mirror 30, 32, 34 includes a wavelength selective diffuser patterned material and the planarizing layer.

Diffuse mirrors 30, 32, 34 are typically formed by creating a rough (e.g., textured, non-flat, or relatively smooth with some bumps) surface in a wavelength selective layer, or creating a rough (e.g., textured, non-flat, or relatively smooth with some bumps) surface in a dielectric layer and coating the rough surface with a wavelength selective layer. In one embodiment, the wavelength selective coating 44 is a multilayer reflector coating, such as a Bragg reflector coating (i.e., a dielectric mirror or an interference filter). The layers in a multilayer dielectric mirror are alternating layers of low and high refractive index materials. Generally, the thickness of each layer is equal to a quarter of the designed central wavelength in that medium, but other designs are possible. In one embodiment, metal oxides (such as $SiO_2$, having a refractive index of 1.45, and $TiO_2$, having a refractive index of 2.44) are used for the layers. Intermediate refractive indices may also be achieved through a suitable combination of $SiO_2$ and $TiO_2$.

The wavelength selective coating 44 or the wavelength selective diffuser patterned material 42 is configured to partially reflect and partially transmit light of a particular wavelength while transmitting light of other wavelengths, thus rendering the mirrors 30, 32, 34 partially reflecting and partially transmitting. The wavelength selective coating 44 or the wavelength selective diffuser patterned material 42 (whichever is used) of each of the mirrors 30, 32, 34 may be made partially reflecting and partially transmitting of a desirable waveband in a variety of ways.

Figure 5:
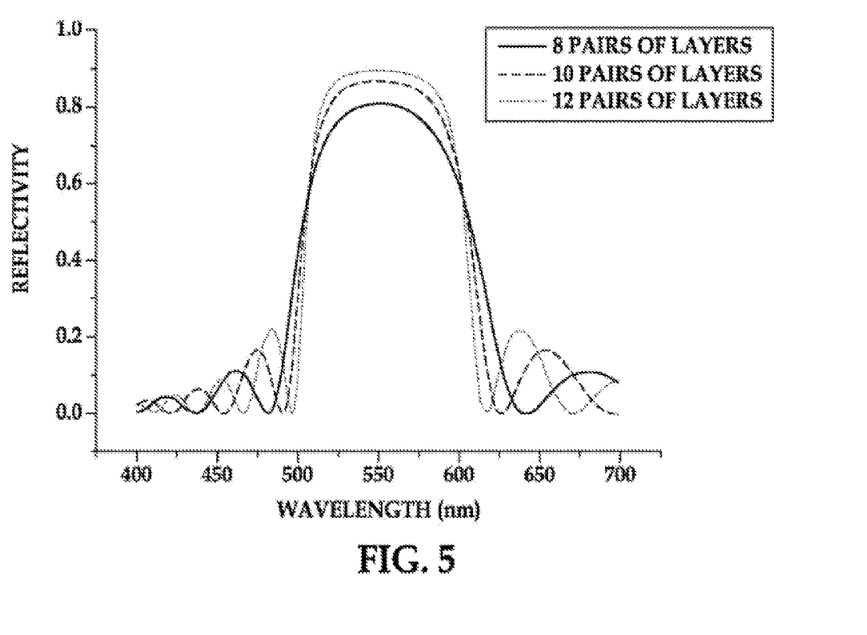
FIG. 5 is a graph illustrating the calculated reflectivity for three embodiments of a multilayer wavelength selective coating, with a design central wavelength of 550 nm.

In one embodiment, the wavelength selective coating 44 or the wavelength selective diffuser patterned material 42 has a uniform reflectivity across the entire area (i.e., the 2-dimensional top surface of each mirror 30, 32, 34) of the mirror 30, 32, 34, where the uniform reflectivity ranges from about 80% to about 95% across the selected waveband. In this embodiment, the mirror 30, 32, 34 has a uniform transmissivity that ranges from about 5% to about 20% across the selected waveband. In another embodiment, each mirror 30, 32, 34 has uniform reflectivity and transmissivity across its area except in the interpixel gaps (i.e., the space between adjacent pixels), where the reflectivity and transmissivity may be non-uniform. When the multilayer wavelength selective coating 44 is used, the uniform partial reflectivity may be achieved by using an appropriate number of layers in the coating 44. The reflectivity depends on the refractive indices of the layers and the number of repeats throughout the multilayer. As such, the number of layers may vary depending upon the desired reflectivity, the materials used, and the order the layers. FIG. 5 illustrates the calculated reflectivity for three embodiments of a wavelength selective coating 42 with a design central wavelength of 550 nm. Each coating includes a different number of alternating layers of low and high refractive index materials. These particular examples include alternating layers of a 1.45 refractive index material and a 1.80 refractive index material. The respective examples include 8 pairs of layers (i.e., 16 total layers), 10 pairs of layers (i.e., 20 total layers), and 12 pairs of layers of (i.e., 24 total layers). As illustrated in FIG. 5, the reflectivity for each wavelength selective coating 42 can be tuned based, at least in part, upon the number of layers used.

Depending upon where this embodiment of the mirror 30, 32, 34 is positioned in the stack 12, the wavelength selective coating 44 or the wavelength selective diffuser patterned material 42 may also transmit other wavebands as previously described. As a non-limiting example, for the blue mirror 30 in FIGS. 3A and 3B, the wavelength selective coating or material is selected is selected such that the wavelengths across a 400 nm to 500 nm blue waveband are 90% reflected across the entire area of the mirror 30 and the wavelengths across the 400 nm to 500 nm blue waveband are 10% transmitted across the entire area of the mirror 30. As such, in this example, 100% of the blue mirror area has a substantially uniform reflectivity of about 90% and a substantially uniform transmissivity of about 10% across the blue waveband. Furthermore, in this example embodiment, the wavelength selective coating 44 or the wavelength selective diffuser patterned material 42 of the blue mirror 30 also allows green and red light to transmit therethrough. While a blue mirror 30 is illustrated as an example of this embodiment, it is to be understood that the other mirrors 32, 34 can be configured to have, across their respective entire areas, a uniform reflectivity and uniform transmissivity across their respective desirable wavebands.

In another embodiment, the wavelength selective coating 44 or the wavelength selective diffuser patterned material 42 is configured, across the area of the mirror 30, 32, 34, to have a predetermined reflectivity of a first predetermined set of wavelengths within the desired waveband, and to have a predetermined transmissivity of a second predetermined set of wavelengths within the desired waveband. The first and second sets of wavelengths include different wavelengths within the desired waveband. The predetermined reflectivity, predetermined transmissivity, and the width of the predetermined sets of wavelengths are selected so that the average reflectivity across the whole waveband associated with the mirror 30, 32, 34 ranges from 80% to 95%. In one example, the area across the mirror 30, 32, 35 is about 100% reflective of the first predetermined set of wavelengths within the desired waveband, and is from about 5% to about 100% transmissive of the second predetermined set of wavelengths within the desired waveband. The second set of wavelengths may be selected to align with the emission wavelengths of the backlight 14, and in this embodiment, the transmissivity of these wavelengths may be up to 100%. In another example, when 10% of the waveband is 100% transmissive across the area and the remaining 90% of the waveband is 100% reflective across the area, the mirror 30, 32, 34 has 90% reflectivity across the waveband.

The portions of the mirror 30, 32, 34 enabling the transmission of the predetermined set of wavelengths are referred to as spectral apertures. Depending upon where this embodiment of the mirror 30, 32, 34 is positioned in the stack 12, the wavelength selective coating 44 or the wavelength selective diffuser patterned material 42 may also transmit other wavebands as previously described. As a non-limiting example, for the green mirror 32 in FIGS. 3A and 3B, the wavelength selective coating or material is selected to be about 100% reflective of the green wavelengths ranging from 500 nm to 530 nm and from 550 nm to 600 nm, and from 5% to about 100% transmissive of the green wavelengths ranging from 530 nm to 550 nm. As such, this non-limiting example of the green mirror 32 is partially transmissive of a predetermined set of the green wavelengths. Furthermore, in this example embodiment, the wavelength selective coating 44 or the wavelength selective diffuser patterned material 42 of the green mirror 32 also allows red light to transmit therethrough. In this example embodiment, the wavelength selective coating 44 or the wavelength selective diffuser patterned material 42 of the green mirror 32 may also be partially reflective and partially transmissive of blue light or fully transmissive of blue light. The mirror 32 may be configured to be partially reflective of blue light, as long as it is at least partially transmissive of a sub-set of blue wavelengths. It would then be desirable to balance the total transmission through the display stack 12 for each color and the brightness of each color emitted by the backlight 14 for the white to appear neutral in transmission mode. While a green mirror 32 is illustrated as an example of this embodiment, it is to be understood that each of the other mirrors 30, 34 can be configured to have a total reflectivity within the desired waveband associated with that mirror 30, 34 and its associated electro-optic layer 24, 28 ranging from about 80% to 95% using a predetermined reflectivity of a first predetermined set of wavelengths within the desired waveband and a predetermined transmissivity of a second predetermined set of wavelengths within the desired waveband.

It is to be further understood that in this embodiment, the set of wavelengths selected to be transmitted through the mirror 30, 32, 34 via spectral apertures may correspond with at least some of the wavelengths emitted by the backlight 14. In one embodiment, the spectral apertures described herein may also be designed for one polarization that matches the polarization of the backlight 14. Furthermore, spectral apertures may be optimized by taking into account the dye absorption spectra. Multilayer dielectric stacks (e.g., including multiple layers (15-30) of silicon dioxide and titanium dioxide) may be designed with the spectral apertures described herein using techniques similar to those used to form dichroic filters.

In still another embodiment, the wavelength selective coating 44 or the wavelength selective diffuser patterned material 42 is configured to partially reflect and partially transmit wavelengths in the desired waveband by having modified areas formed therein. In one embodiment, the modified area makes up from about 5% to about 20% of the entire mirror area (assuming about 100% reflective outside the modified area and 100% transmissive within the modified area). The modified area is configured to have a predetermined transmissivity of a predetermined waveband, or sub-waveband, or polarization of a waveband or sub-waveband. The remaining unmodified area of the mirror 30, 32, 34 reflects wavelengths within the waveband so that the overall reflectivity of the mirror 30, 32, 34 within the predetermined waveband is 80% to 95% and the overall transmissivity within the predetermined waveband is 5% to 20%. The modified area may be made up of physical apertures (shown as reference numeral 48 in FIG. 7), spectral apertures, waveplate spots (e.g., for cholesteric mirrors), or additional dielectric layers. In one embodiment, the modified area allows 5% to 20% of the light from the backlight 14 through the mirror 30, 32, 34, while the mirror 30, 32, 34 reflects 80% or more of the ambient light. As one non-limiting example, if the modified area is 100% transmissive and is formed in 10% of the mirror area, then 10% of the light will pass through that mirror 30, 32, 34. The remaining unmodified area of the mirror 30, 32, 34 is highly reflective to ensure that 80% or more of the ambient light (within the assigned waveband) is reflected.

Figure 7:
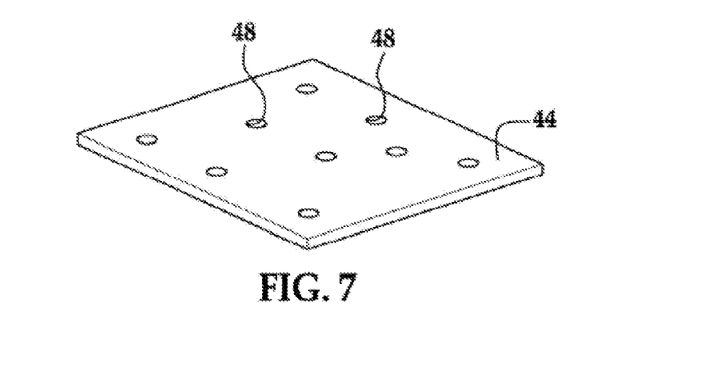
FIG. 7 is a perspective view of an embodiment of a partially reflecting and partially transmitting coating including physical apertures that may be used in an embodiment of a mirror.

A perspective schematic view of some physical apertures (or through-holes) 48 formed in the wavelength selective coating 44 is shown in FIG. 7. The physical apertures 48 can make up anywhere from about 5% to about 20% of the area of the mirror 30, 32, 34. This would result in the overall or average reflectivity of the mirror 30, 32, 34 ranging from about 80% to about 95% over the assigned waveband if the mirror 30, 32, 34 is 100% reflective across the waveband over the remaining unmodified area. Physical apertures 48 may be formed in metal oxide layers using any patterning technique, such as lift-off photolithography and laser ablation, and physical apertures 48 may be formed in cholesteric polymers by imprinting the apertures into the polymer before the polymer is cured. The density of physical apertures 48 would be selected so that several apertures 48 would be present per pixel, thus removing the need to align the physical apertures 48 in a mirror 30, 32, 34 with adjacent electrode(s) 38, 40. In the embodiments disclosed herein, there is also no requirement to align the physical apertures 48 in any particular manner. Furthermore, as will be described further hereinbelow, during emissive mode, light from the backlight 14 that does not hit an aperture 48 or is able to pass through the mirror 30, 32, 33 will be reflected back to be recycled in the backlight 14.

As a non-limiting example, for the red mirror 34 in FIGS. 3A and 3B, the wavelength selective coating or material is selected to have physical apertures 48 formed in 15% of the entire area. The wavelength selective coating 44 or material 42 would have a high reflectivity (e.g., 100%) across the red waveband, and the physical holes 48 would enable all red wavelengths (including those of the backlight 14) to be transmitted therethrough. As described herein, this mirror 34 is also transmissive of blue and green wavelengths, and thus those wavelengths will also be transmitted through the entire area of the mirror 34. While a red mirror 34 is illustrated a an example of this embodiment, it is to be understood that the other mirrors 30, 32 can be configured to have from about 5% to about 20% of a modified area formed therein.

As previously mentioned, the modified area may be designed for one polarization, for example, the polarization that matches the polarization of the backlight 14. In one non-limiting example, the physical holes 48 described herein may also be designed for the polarization that matches the polarization of the backlight 14. For example, the coating 44 or material 42 may be made up of two or three cholesteric polymer layers to ensure reflection, and physical holes 48 may be formed in one of the layers to ensure transmission of the one polarization.

While each of the embodiments of the partially reflective and partially transmissive mirror 30, 32, 34 has been described separately herein, it is to be understood that any of the configurations for achieving the desired partial reflectivity and partial transmissivity can be combined together in a single mirror 30, 32, 34. For example, the wavelength selective coating 44 or the wavelength selective diffuser patterned material 42 may have a uniform reflectivity of 95% across the entire area and across the entire selected waveband, and may also include physical holes in about 5% of the entire area. As another example, the mirror 30, 32, 34 may include both spectral and physical apertures.

Referring back to FIG. 6, the mirror 30, 32, 34 may also include the previously mentioned planarizing layer 46. This layer contributes to providing a relatively smooth surface for the mirror 30, 32, 34. The planarizing layer 46 may be any transparent dielectric material.

Again referring to FIGS. 3A and 3B, one embodiment of the display stack 12 further includes transparent substrates 50, 52, 54, 56. The substrates 50, 52, 54, 56 are positioned between the mirrors 30, 32, 34, and the electrode 40 positioned closest to and above the mirror 30, 32, 34 and also on the electrode 38. The substrates 50, 52, 54, 56 are transparent materials such as glass or a thin plastic film, which will allow light to pass through the stack 12, whether the display is in reflection more or emissive mode. Non-limiting examples of suitable plastic films include polyethersulphone (PES), polyethylene terephthalate (PET), or polyethylene naphthalate (PEN). The substrates 50, 52, 54, 56 are thin enough to avoid parallax. While the thickness depends, at least in part, upon the size of the pixels, in one embodiment the thickness of each of the substrates 50, 52, 54, 56 is equal to or less than 150 µm.

Embodiments of the display 10 also include a light source or backlight 14. As shown in FIG. 1, the backlight 14 is positioned to emit at least some light through all of the display stacks 12 in the display 10. FIGS. 3A and 3B illustrate one stack 12 in the display 10 and the backlight 14 positioned to emit at a east some light through the stack 12. Embodiments of the mirrors 30, 32, 34 disclosed herein having partial reflectivity and partial transmissivity provide the advantage of enabling a sufficient amount of light to be reflected during reflection mode to illuminate the display with ambient light, while also allowing adequate transmission during emissive mode to illuminate the display with light from the backlight 14. Reflective mode is schematically illustrated in FIG. 3A, while emissive mode is schematically illustrated in FIG. 3B. As illustrated in FIG. 3A, the mirrors 30, 32, 34 are partially reflective and partially transmissive, and thus some of the light (e.g. B, 21, G, 21, and R, 21) of the respective wavebands will pass through the respective mirrors 30, 32, 34. The transmitted light may be reflected by the backlight 14.

Whether in reflective mode or emissive mode, the electrode(s) 38, 40 adjacent to each electro-optic layer 24, 26, 28 may be selectively addressed in order to achieve the desired image.

As shown in FIG. 3A, light is emitted from the external light source 22 toward the display stack 12. The blue light (introduced from the external light source 22) has been modulated by the yellow electro-optic layer Y, 24 and does not need to pass through any more layers. The blue mirror 30 is configured, via one or more of the embodiments previously described, to partially reflect (e.g., reflect 80% to 95% of the light B, 20) the modulated blue light, while allowing some of the modulated blue light (e.g., B, 21) as well as red and green light to pass. The final brightness of the modulated and reflected blue light B, 20 as perceived by the viewer 18 (not shown in FIGS. 3A and 3B) is greater, in part because the majority of the blue light does not pass through the lower layers and thus does not encounter more loss as a result of losses in these lower layers. Additionally the spectrum of the modulated and reflected blue light B, 20 is not modulated by out-of-band absorption in the other electro-optical modulation layers M, 26 and C, 28. Unlike the reflected blue light B, 20, it is to be understood that there may be some residual modulation from the blue light B, 21 that is transmitted through the mirror 30, which will be affected by lower layers, and then returns to the viewer. However, this will be small as only 5% to 20% of blue light B, 21 will pass through the mirror 30.

The green light (introduced from the external light source 22) has been modulated by the magenta electro optic layer M, 26 and does not need to pass through any more layers. The green mirror 32 is configured, via one or more of the embodiments previously described, to partially reflect the modulated green light, while allowing some of the modulated green light (e.g., G, 21) as well as red light to pass. The final brightness of the modulated and reflected green light C, 20 as perceived by the viewer 18 is greater because the majority of the green light did not go through the lower layers. Additionally, the spectrum of the modulated and reflected green light G, 20 is not modulated by out-of-band absorption in the other electro-optical modulation layer C, 28. Unlike the reflected green light G, 20, is to be understood that there may be some residual modulation from the green light G, 21 that is transmitted through the mirror 32, which will be affected by lower layers, and then returns to the viewer. However, this will be small, as only 5% to 20% of green light G, 21 will pass through the mirror 32.

The red light (introduced from the external light source 22) has been modulated by the cyan electro-optic layer C, 28. The red mirror 36 is configured, via one or more of the embodiments previously described, to partially reflect the modulated red light, while allowing some of the modulated red light (e.g., R, 21) as well as unreflected green and blue light to pass.

As illustrated in FIG. 3B, light 16 in one or more wavebands (B, G, R) is emitted from the backlight 14. Each of the mirrors 30, 32, 34 is partially reflective and partially transmissive of some or all of the wavelengths of the waveband associated therewith and some embodiments of the mirrors 30, 32, 34 are specifically designed to be partially transmissive of some or all of the wavelengths associated with the backlight 14. As such, at least some light emitted from the backlight 14 passes through each of the respective mirrors 30, 32, 34 and thus through the display stack 12.

More particularly, the blue light B, 16 emitted from the backlight 14 is transmitted through all of the layers (e.g., 34, 56, 40, 28, 38, 32, 54, and 26) before reaching the blue mirror 30. The partially transmissive characteristics of the blue mirror 30 enable predetermined wavelengths within the blue waveband and/or a predetermined percentage of all or a portion of the blue waveband to be transmitted therethrough. The transmitted portion of the blue light is shown in FIG. 3B as 16', B. This light passes through the partially reflective/partially transmissive blue mirror 30 and can be modulated by the yellow electro-optic layer Y, 24. The transmitted blue light 16' is ultimately viewable by the viewer 18.

As illustrated in FIG. 3B, the transmitted light passes once through the electro-optic layer 24, 26, 28, whereas reflected light passes through respective electro-optic layers 24, 26, 28 twice. This may result, in some embodiments, in a higher contrast for reflection than transmission.

Similarly, the green light G, 16 emitted from the backlight 14 is transmitted through all of the layers (e.g., 34, 56, 40, 28, and 38) before reaching the green mirror 32. The partially transmissive characteristics of the green mirror 32 enable predetermined wavelengths within the green waveband and/or a predetermined percentage of all or a portion of the green waveband to be transmitted therethrough. The transmitted portion of the green light is shown in FIG. 3B as 16', G. This light passes through the partially reflective/partially transmissive green mirror 32 and can be modulated by the magenta electro-optic layer M, 26. The possibly modulated green light 16', G will then pass through the blue mirror 30 (which does not substantially reflect green light) and through the yellow electro-optic layer Y, 24 (which does not substantially absorb green light), and will ultimately be viewable by the viewer 18.

Still further, the red light R, 16 emitted from the backlight 14 is transmitted through none of the layers before reaching the red mirror 34. The partially transmissive characteristics of the red mirror 34 enable predetermined wavelengths within the red waveband and/or a predetermined percentage of all or a portion of the red waveband to be transmitted therethrough. The transmitted portion of the red light is shown in FIG. 3B as 16', R. This light passes through the partially reflective/partially transmissive red mirror 34 and can be modulated by the cyan electro-optic layer C, 28. The possibly modulated red light 16', R will then pass through the green mirror 32 (which does not substantially reflect red light), the magenta electro-optic layer M, 26 (which does not substantially absorb red light), the blue mirror 30 (which does not substantially reflect red light), and the yellow electro-optic layer 24 (which does not substantially absorb red light), and will ultimately be viewable by the viewer 18.

Also as shown in FIG. 3B, light 16" from the backlight 14 that is not transmitted by any of the interlayer mirrors (due to its reflective properties) will be reflected back to the backlight 14, where it will be recycled so that a desirable percentage of the light from the backlight 14 will ultimately be transmitted. When light is recycled in this manner, more than the designed single pass transmission percentage will pass through the stack 12. The designed single pass transmission will depend upon many factors, including the reflectivity and transmissivity of the mirrors 30, 32, 34. As one non-limiting example, if the spectral apertures and/or modified areas enable 10% of the backlight to pass through on the first pass, then an additional 10% of up to 90% of recycled light may pass through on the second pass. It is to be understood that other losses may add up during the second and subsequent passes.

The degree of recycling will be limited by residual absorption in the layers beneath each interlayer mirror 30, 32, 34 and by any losses in the backlight unit 14, but the main source of absorption for one particular color (e.g., blue, green or red) light will be the electro-optic layer 24, 26, 28 which is above the interlayer mirror 30, 32, 34.

Embodiments of the display stack 12 are addressed using an addressing layer 60, as shown in FIG. 8. Each pixel/display stack 12 in a display 10 may be addressed using an addressing layer 60. In one embodiment, this requires an addressing layer 60 for each electro-optic layer 24, 26, 28. In another embodiment, one addressing layer 60 may be used to address each electro-optic layer 24, 26, 28. This addressing layer 60 is positioned between the backlight 14 and the mirror 34 and operatively connects to each electro-optic layer 24, 26, 28 through conductive vias (e.g., see reference numeral 70 in FIG. 9A) which run through all of the layers in the display stack 12.

The addressing layer 60 shown in FIG. 8 utilizes active matrix addressing and thus includes a switching device 66. While not shown, it is to be understood that the addressing layer may also be configured for passive addressing, where the electro-optic layers 24, 26, 28 have a threshold for switching and may have some inherent memory. In passive addressing, there may not be a switching device 66. The device 10 may also be a direct drive device, where each pixel of the display 10 is individually connected to a driving electrode.

Figure 9A:
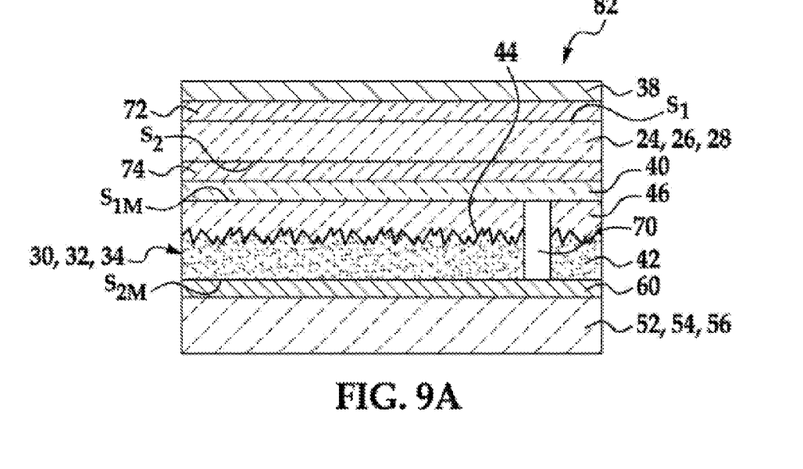
FIGS. 9A and 9B are cross-sectional views of two embodiments of a sub-stack that may be in into another embodiment of a display stack.
Figure 9B:
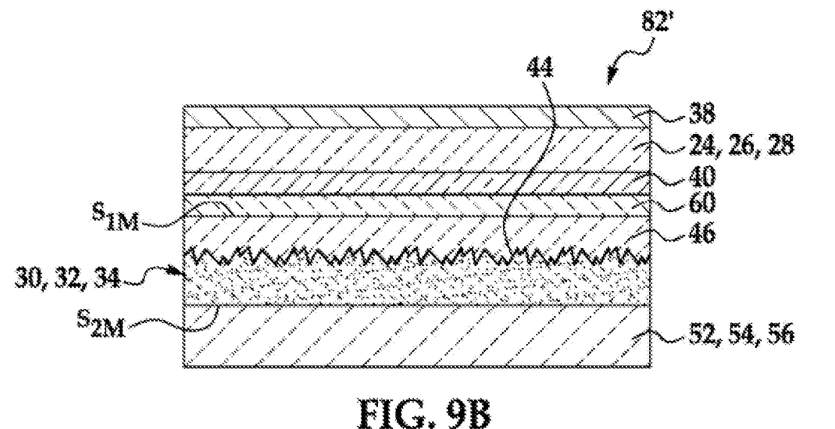

According to one embodiment, the addressing layer 60 includes a number of horizontal lines 62 and a number of vertical lines 64. In the embodiment shown in FIG. 8, the switching device 66 is operatively connected at each intersection between the horizontal lines 62 and vertical lines 64. Each switching device 66 is also connected to the electrode 40. In embodiments in which each electro-optic layer 24, 26, 28 is addressed by its own addressing layer 60, the addressing layer 60 may be integrated into the stack 12 (a sub-stack 82 of which is shown in FIG. 9A) between each substrate 52, 54, 56 and mirror 30, 32, 34, or may be integrated into the stack 12 (a sub-stack 82' of which is shown in FIG. 9B) between each mirror 30, 32, 34 and the electrode 40. While not shown, it is to be understood that the addressing layer 60 and electrode 40 may be in direct contact with one another and may both be positioned between each substrate 52, 54, 56 and mirror 30, 32, 34. In another embodiment (not shown) in which one addressing layer 60 is used for the entire display 10, one electrode 40 may be integrated into the stack 12 between the backlight 14 and the mirror 34 and is operatively connected to each electro-optic layer 24, 26, 28 through conductive vias which run through all of the layers of the display stack 12.

As previously discussed, depending on an electric signal received by the electrode 40 through the switching device 66, the electrically connected electro-optic layer 24, 26, 28 may change absorption spectral properties to show different colors of light to the viewer 18.

One type of switching device 66 that may be used is a transistor, such as thin film transistors (TFT) or a Meta Insulator-Semiconductor Field Effect Transistor (MISFET) device. Transistors generally include three terminals: a gate, a drain, and a source; however, there are many transistor configurations (e.g., N-channel or P-channel devices, etc.). If the signal supplied to the gate of a P channel MISFET device is lower than a threshold voltage, then the transistor may be in an ON state, allowing electric current to pass between the drain and a source. If a transistor is in an OFF state, then electric current is prohibited from flowing between the source and the drain. A TFT includes layers of semiconductor material and conductive material that are deposited onto a transparent substrate in thin films. The thin nature of TFTs may be particularly suitable for flat panel displays.

The gate terminal of each switching device 66 may be connected to a vertical line 64, while the source terminal of each switching device 66 may be connected to a horizontal line 62, or vice versa. If the switching devices 66 are P channel devices, then a low signal received along the vertical line 64 may switch the transistors along that line into an ON state. If a transistor is in an ON state and receives a signal from a horizontal line 62, the signal may flow through the transistor to the electrode 40. Thus, the electrical state of an individual electrode 40 may be changed by signals received through the addressing matrix 60.

In some embodiments, a capacitive device may be used with each transistor. The capacitive device may hold the electrode 40 in its assigned state until the next refresh cycle of the display 10. Typical display devices 10 include a refresh cycle in which the state of each pixel/display stack 12 is refreshed at regular intervals. These regular intervals are typically faster than the human eye is able to detect.

Referring now to FIG. 9A, one sub-stack 82 of another embodiment of the pixel/display stack 12 is depicted. It is to be understood that this sub-stack 82 does not show multiple electro-optic layers 24, 26, 28 and multiple mirrors 30, 32, 34. Rather, FIG. 9A illustrates one portion or section 82, and it is to be understood that multiple portions/sections could be stacked to include each of the electro-optic layers 24, 26, 28 and mirrors 30, 32, 34 (similar to that shown in FIGS. 3A and 3B).

The sub-stack shown in FIG. 9A includes an electrode 40 operatively connected to the addressing layer 60 for the associated electro-optic layer 24, 26, or 28. The electrode 40 is deposited on the substrate 52, 54, or 56 and below the associated electro-optic layer 24, 26, or 28.

In this embodiment, the electrode 40 may be operatively connected to the addressing layer 60 through a field via 70. The electrode 40 may not be transparent, but may cover a small area of the pixel. The field via 70 is formed in the mirror 30, 32, or 34 and provides an electrical path between a switching device 66 (not shown in FIG. 9A) of the addressing layer 60 and the electrode 40. The field via 70 may be made of any electrically conductive material.

As shown in FIG. 9A, one embodiment of the sub-stack 82 also includes alignment layers 72, 74 that may be positioned directly adjacent first and second surfaces $S_1$, $S_2$ of the electro-optic layer 24, 26, or 28. The alignment layers 72, 74 may be selected to insulate the electro-optic layer 24, 26, or 28 from the electrodes 38 and/or 40. The alignment layers 72, 74 may also provide the correct alignment and surface energy boundary conditions for the electro-optical mode. Alignment layers 72, 74 may be included or not included in any embodiment of the stack 12 disclosed herein, and the inclusion of the alignment layers 72, 74 will depend, at least in part, upon the electro-optic layers 24, 26, 28 that are used.

In one embodiment, the electrode 38 positioned above (i.e., the electrode of a pair 38, 40 that is closer to the external light source 22) the electro-optic layer 24, 26, or 28 may be held at a constant bias voltage. This bias voltage may be set to the proper value in order to have the electro-optic layer 24, 26, or 28 function properly.

Referring now to FIG. 9B, one sub-stack 82' of another embodiment of the pixel/display stack 12 is depicted. It is to be understood that this sub-stack 82' does not show multiple electro-optic layers 24, 26, 28 and multiple mirrors 30, 32, 34. Rather, FIG. 9B illustrates one portion or section 82', and it is to be understood that multiple portions/sections could be stacked to include each of the electro-optic layers 24, 26, 28 and mirrors 30, 32, 34 (similar to that shown in FIGS. 3A and 3B).

The sub-stack shown in FIG. 9B includes an electrode 40 operatively connected to the addressing layer 60 for the associated electro-optic layer 24, 26, or 28. The electrode 40 is deposited on the surface $S_{1M}$ of the mirror 30, 32, 34. In this embodiment, the electrode 40 is operatively connected to the addressing layer 60 without field vias 70.

Another embodiment of the pixel/display stack 12' is shown in FIG. 10. In this embodiment, the stack 12' includes multiple waveplates 76. Waveplates 76 are used when a dichroic liquid crystal system that switches between a planar untwisted state and a vertical state is used. In one embodiment, a quarter waveplate is selected for the waveplates 76. It is to be understood, however, that the waveplates 76 may not be exactly quarter waveplates in order to tune the polarization state in the entire stack 12'. In the embodiment of FIG. 10, the waveplates 76 ensure that all polarizations are absorbed in reflection mode. The waveplate 76 is positioned between the mirror 30, 32, 34 and the corresponding electro-optic layer 24, 26, 28. In one embodiment, each waveplate 76 is directly adjacent to the first surface $S_{1M}$ of each mirror 30, 32, 34. The optic axis of the waveplate 76 is at 45° with respect to the alignment of the liquid crystal in the electro-optic layer 24, 26, 28 positioned closest to and above (i.e., closer to the external light source 22) the waveplate 76.

In this embodiment, the backlight 14 is a conventional white backlight unit and a polarizer 78 is placed on top of the backlight 14. The polarizer 78 is also aligned with the liquid crystal alignment direction. In emissive/backlit mode, the light passes once through the waveplate 76 between the interlayer mirror 30, 32, 34 and the electro-optic layer 24, 26, 28 which results in the light being circularly polarized. One-half of this ight would be absorbed by the electro-optic layer 24, 26, 28. To ensure that the light is linearly polarized in the correct direction, an extra waveplate 76 may be inserted in the stack 12' between the opposed side $S_{2M}$ of the mirror 30 or 32 and before the next electro-optic layer 26 or 28 in the stack 12' or between the opposed side $S_{2M}$ of the mirror 34 and before the backlight 14. In one embodiment, each waveplate 76' is directly adjacent the second surface $S_{2M}$ each mirror 30, 32, 34. The extra waveplates 76' may also be quarter waveplates. The addition of the waveplates 76' does not affect the reflection mode as the external light is unpolarized.

As mentioned above when discussing the various embodiments of the electro-optic layers 24, 26, 28, when the twisted configuration liquid crystal system is used for the electro-optic layers 24, 26, 28, no waveplates 76, 76' are included in the display stack 12 (see e.g., the embodiment shown in FIGS. 3A and 3B). This is due, in part, to the fact that the twisted configuration of the liquid crystals enables both polarizations of light to be absorbed and color to be visible. The elimination of the wave plates 76, 76' simplifies the display stack 12.

It is to be understood that the ranges provided herein include the stated range and any value or sub-range within the stated range. For example, an amount ranging from about 1% to about 20% should be interpreted to include not only the explicitly recited amount limits of 1% to about 20%, but also to include individual amounts, such as 2%, 3%, 4%, etc., and sub-ranges, such as 5% to 15%, 10% to 20%, etc. Furthermore, when about is utilized to describe a value, this is meant to encompasses mirror variations (up to 0.3) from the stated value (e.g., ±0.3% from the stated percentage).

While several embodiments have been described in detail, it will be apparent to those skilled in the art that the disclosed embodiments may be modified. Therefore, the foregoing description is to be considered nonlimiting.

What is claimed is:

1. A transflective display, comprising:
    a backlight and
    a display stack, including:
        a first electro-optic layer configured to modulate light of a first waveband;
        a second electro-optic layer configured to modulate light of a second waveband that is different from the first waveband;
        a mirror positioned between the first and second electro-optic layers such that the first electro-optic layer is positioned adjacent to a first surface of the mirror and has a surface that is configured to face an external light source and the second electro-optic layer is positioned adjacent to a second surface of the mirror that is configured to face the backlight, wherein the mirror is configured to partially reflect and partially transmit wavelengths in the first waveband and to at least partially transmit wavelengths in the second waveband; and an electrode layer positioned between the first electro-optic layer and the first surface of the mirror.

2. The transflective display as defined in claim 1 wherein the mirror is configured to partially reflect and partially transmit wavelengths in the first waveband by having a substantially uniform reflectivity across an area of the mirror, a substantially uniform reflectivity of 80% to 97% across the first waveband, and a substantially uniform transmissivity of 5% to 20% across the first waveband.

3. The transflective display as defined in claim 1 wherein the mirror is configured, across its area, to have a predetermined reflectivity of a predetermined set of wavelengths in the first waveband, wherein the mirror is also configured, across its area, to have a predetermined transmissivity of a second predetermined set of wavelengths in the first waveband, and wherein the predetermined reflectivity and predetermined transmissivity are selected such that the average reflectivity across the first waveband ranges from 80% to 95%.

4. The transflective display as defined in claim 3 wherein the second predetermined set of wavelengths includes wavelengths emitted by the backlight that are within the first waveband.

5. The transflective display as defined in claim 1 wherein the mirror is configured to partially reflect and partially transmit wavelengths in the first waveband by including about 5% to about 20% of an area of the mirror that is modified for transmitting i) the wavelengths in the first waveband, or ii) a sub-band of wavelengths in the first waveband or iii) one polarization of the wavelengths in the first waveband, and wherein an unmodified area of the mirror is configured to reflect the wavelengths in the first waveband.

6. The transflective display as defined in claim 5 wherein the modified area is selected from physical apertures formed in the mirror, spectral apertures firmed in the mirror, waveplate spots integrated into the mirror, and additional dielectric layers integrated into the mirror.

7. The transflective display as defined in claim 1 wherein the mirror is configured to diffusely reflect light.

8. The transflective display as defined in claim 1 wherein the mirror configured to partially reflect and partially transmit wavelengths in the first waveband via a combination of at least of i) a substantially uniform reflectivity and a substantially uniform transmissivity, ii) spectral apertures, or iii) modified areas.

9. A transflective display, comprising:
a first electro-optic layer configured to modulate light of a blue waveband, the first electro-optic layer having a first surface facing an external light source and a second surface opposed to the first surface;
a first mirror having first and second surfaces and positioned such that s first surface is adjacent to the second surface of the first electro-optic layer;
a second electro-optic layer having first and second surfaces, positioned such that its first surface is adjacent to the second surface of the first mirror, and configured to modulate light of a green waveband;
a second mirror having first and second surfaces and positioned such that its first surface is adjacent to the second surface of second electro-optic layer;
a third electro-optic layer having first and second surfaces, positioned such that its first surface is adjacent to the second surface of the second mirror, and configured to modulate light of a red waveband;
a third mirror having first and second surfaces and positioned such that its first surface is adjacent to the second surface of the third electro-optic layer; and a backlight positioned adjacent to the second surface of the third mirror and configured to emit light toward the electro-optic layers when the transflective display is in at least an emissive mode;
wherein the first mirror is configured to partially reflect and partially transmit wavelengths in the blue waveband and to at least partially transmit wavelengths in the green and red wavebands, wherein the second mirror is configured to partially reflect and partially transmit wavelengths in the green waveband and to at least partially transmit wavelengths in the blue waveband and the red waveband, and wherein the third mirror configured to partially reflect and partially transmit wavelengths in the red waveband, the green waveband, and the blue waveband.

10. The transflective display as defined in claim 9 wherein at least one of:
the first mirror is configured to partially reflect and partially transmit wavelengths in the blue waveband by having a substantially uniform reflectivity across an area of the first mirror and a substantially uniform reflectivity of 80% to 95% across the blue waveband;
the second mirror is configured to partially reflect and partially transmit wavelengths in the green waveband by having a substantially uniform reflectivity across an area of the second mirror and a substantially uniform reflectivity of 80% to 95% across the green waveband; or
the third mirror is configured to partially reflect and partially transmit wavelengths in the red waveband by having a substantially uniform reflectivity across an area of the third mirror and a substantially uniform reflectivity of 80% to 95% across the red waveband.

11. The transflective display as defined in claim 9 wherein at least one of:
the first mirror is configured, across its area, to have about 100% reflectivity of a predetermined set of wavelengths in the blue waveband, and wherein the first mirror is also configured, across its area, to have from about 5% to about 100% transmissivity of a second predetermined set of wavelengths in the blue waveband;
the second mirror is configured, across its area, to have about 100% reflectivity of a predetermined set of wavelengths in the green waveband, and wherein the second mirror is also configured, across its area, to have from about 5% to about 100% transmissivity of a second predetermined set of wavelengths in the green waveband; or
the third mirror is configured, across its area, to have about 100% reflectivity of a predetermined set of wavelengths in the red waveband, and wherein the third mirror is also configured, across its area, to have from about 5% to about 100% transmissivity of a second predetermined set of wavelengths in the red waveband.

12. The transflective display as defined in claim 9 wherein at least one of:
the first mirror is configured to partially reflect and partially transmit wavelengths in the blue waveband by including modified areas formed in about 5% to about 20% of an area of the first mirror wherein the first mirror modified areas are configured to transmit 1) the wavelengths in the blue waveband, or n) a predetermined set of wavelengths in the blue waveband or iii) one polarization of the wavelengths in the blue waveband, and wherein an unmodified area of the first mirror area is configured to reflect the wavelengths within the blue waveband;

the second mirror is configured to partially reflect and partially transmit wavelengths in the green waveband by including modified areas formed in about 5% to about 20% of an area of the second mirror, wherein the second mirror modified areas are configured to transmit i) the wavelengths in the green waveband, or ii) a predetermined set of wavelengths in the green waveband or iii) one polarization of the wavelengths in the green waveband, and wherein an unmodified area of the second mirror area is configured to reflect the wavelengths within the green waveband; or the third mirrors is configured to partially reflect and partially transmit wavelengths in the red waveband by including modified areas formed in about 5% to about 20% of an area of the third mirror, wherein the third mirror modified areas are configured to transmit i) the wavelengths in the red waveband, or ii) a predetermined set of wavelengths in the red waveband or iii) one polarization of the wavelengths in the red waveband, and wherein an unmodified area of the third mirror area is configured to reflect the wavelengths within the red waveband.

13. The transflective display as defined in claim 9 wherein:

at least one of the mirrors is configured to partially reflect and partially transmit wavelengths in its associated waveband by having a substantially uniform reflectivity across an area of the mirror and a substantially uniform reflectivity of 80% to 95% across the associated waveband; or at least one of the mirrors is configured, across its area, to have about 100% reflectivity of a predetermined set of wavelengths in its associated waveband, and to have from about 5% to about 100% transmissivity of a second predetermined set of wavelengths in the associated waveband; or at least one of the mirrors is configured to partially reflect and partially transmit wavelengths in its associated waveband by including modified areas formed in about 5% to about 20% of its area, wherein the modified areas are configured to transmit i) the wavelengths in the associated waveband, or ii) a predetermined set of wavelengths in the associated waveband or iii) one polarization of the wavelengths in the associated waveband, and wherein an unmodified area of the still other mirror area is configured to reflect the wavelengths within the associated waveband; and the at least one of the mirrors is configured differently from at least one other of the mirrors.

14. A method, comprising:

selecting a first electro-optic layer for modulating light of a first waveband;

selecting a second electro-optic layer for modulating light of a second waveband that is different from the first waveband;

operatively positioning a mirror between the first and second electro-optic layers such that the first electro-optic layer is positioned adjacent to a first surface of the mirror and has a surface that is configured to face an external light source and the second electro-optic layer is positioned adjacent to a second surface of the mirror and has a surface that is configured to face a backlight, wherein the mirror is configured to partially reflect and partially transmit wavelengths in the first waveband and to at least partially transmit wavelengths in the second waveband; and positioning an electrode layer between the first electro-optic layer and the mirror.

15. The method as defined in claim 14, further comprising forming the mirror with at least one of:

a substantially uniform reflectivity across an area of the mirror and a substantially uniform reflectivity of 80% to 95% across the first waveband;

at least 90% reflectivity of a predetermined set of wavelengths in the first waveband and 5% to 20% transmissivity of a second predetermined set of wavelengths in the first waveband across its area; or modified areas in about 5% to about 20% of an area of the mirror, wherein the modified areas are configured to transmit at least some wavelengths within the first waveband and wherein an unmodified area of the mirror is configured to reflect the wavelengths within the first waveband.

16. The transflective display of claim 1 wherein the electrode layer comprises a first electrode, the transflective display comprising:

the first electrode positioned between the first surface of the mirror and the first electro-optic layer, and a second electrode positioned between the second surface of the mirror and the second electro-optic layer.

17. The transflective display of claim 9 comprising:

a first electrode positioned between the second surface of the first electro-optic layer and the first surface of the first mirror; and a second electrode positioned between the first surface of the second electro-optic layer and the second surface of the mirror.

18. The method of claim 14 wherein positioning an electrode layer between the first electro-optic layer and the mirror comprises:

positioning a first electrode between the first electro-optic layer and the mirror.

19. The method of claim 14 comprising:

positioning a second electrode layer between the second electro-optic layer and the mirror.

* * * * *